March 29, 1938. C. G. OLSON 2,112,495
LOCK WASHER
Filed Aug. 8, 1935
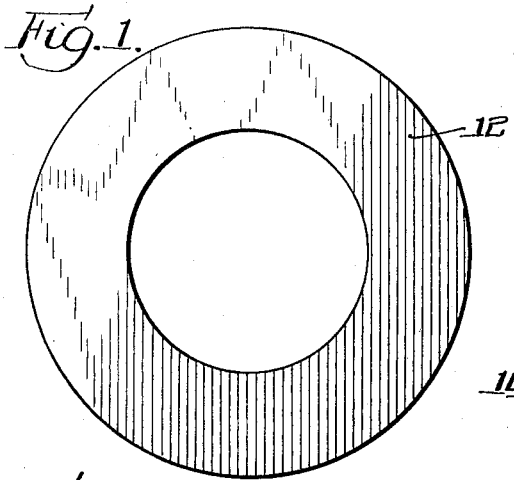
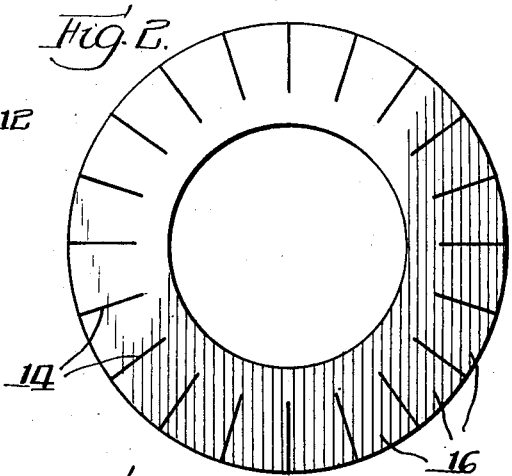
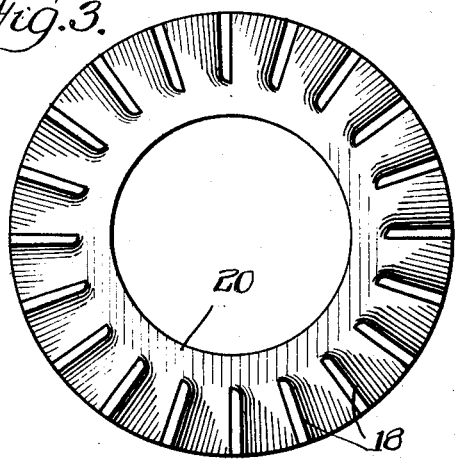
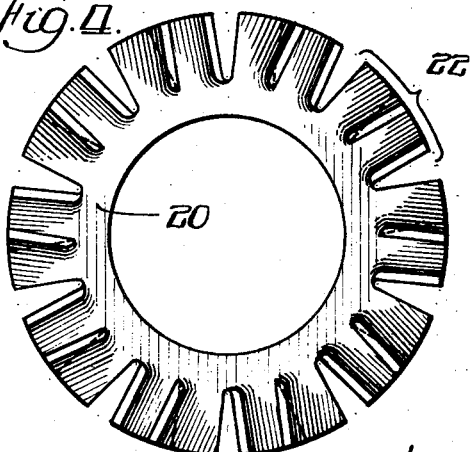
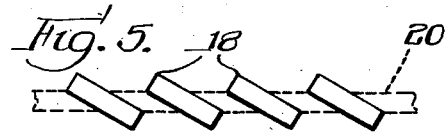
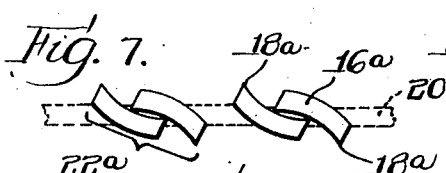
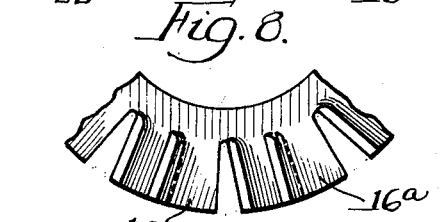
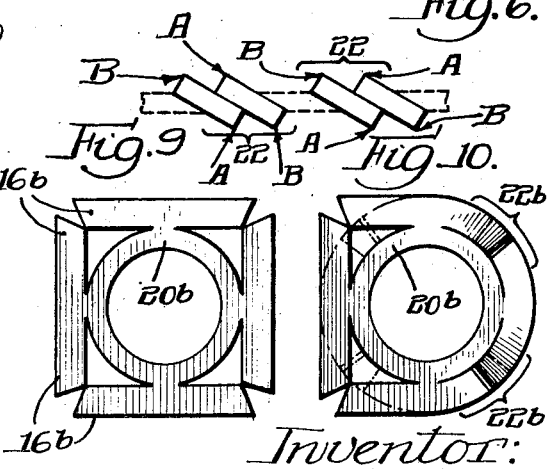
Inventor:
Carl G. Olson
By:- Cox & Moore attys.

Patented Mar. 29, 1938

2,112,495

UNITED STATES PATENT OFFICE 2,112,495

LOCK WASHER

Carl G. Olson, Chicago, Ill., assignor to Illinois Tool Works, Chicago, Ill., a corporation of Illinois Application August 8, 1935, Serial No. 35,283

14 Claims. (Cl. 151—35)

This invention relates generally to lock washers and method of making same, and more particularly to lock washers of the overlapping prong type.

It is one of the important objects of my invention to produce lock washers of the overlapping prong type without subjecting the body or prongs of the washer to any permanent distortion.

To this end, I propose to so shift pairs of prongs toward each other as to produce the overlapping effect, thereby precluding the necessity of distorting or changing the size or shape of the annular body portion.

More specifically, my invention contemplates severing portions of a washer blank, and subsequently shifting adjacent margins of the prongs formed during the severing operation toward each other so as to produce a plurality of circumferentially spaced overlapping prong margins.

The foregoing and numerous other objects and advantages will be more apparent from the following detailed description when considered in connection with the accompanying drawing, wherein—

Figure 1 is a plan view of a washer blank, from which a lock washer constructed in accordance with the teachings of my present invention may be formed;

Figure 2 discloses the step of marginally severing or slitting the washer blank so as to produce a plurality of prongs;

Figure 3 discloses said prongs warped so as to present work engaging edges positioned on opposite sides of the medial plane of the washer;

Figure 4 discloses pairs of said warped teeth shifted toward each other sufficiently to produce the overlapping of adjacent radial prong margins;

Figure 5 discloses the relative positions occupied by the prongs when the washer of Figure 3 is viewed edgewise, the body of said washer being indicated by dotted lines;

Figure 6 discloses the prongs of Figure 5 when they have been shifted in the manner indicated in Figure 4 so as to produce pairs of overlapping prongs;

Figure 7 is a view similar to Figure 6 disclosing overlapping prongs of modified form, namely, prongs which are slightly arcuate in transverse cross section;

Figure 8 is a fragmentary plan view of a washer having overlapping prongs of the type shown in Figure 7;

Figure 9 is a plan view of a modified washer structure formed from a substantially square piece of flat stock, the severing of the stock serving to present a series of washer prongs and an internal continuous annular washer body; and Figure 10 discloses the prongs of Figure 9 shifted toward each other to produce the overlapping thereof.

Referring now to the drawing more in detail wherein like numerals have been employed to designate similar parts throughout the various figures, it will be seen that my invention contemplates the method of producing lock washers which consists in first forming an annular blank 12 preferably from suitable flat resilient stock. Marginal radial severances or slits 14 are formed to present a plurality of marginal prongs 16. These prongs 16 are then warped or flexed so as to present a plurality of working engaging edges 18 positioned on opposite sides of the medial plane of the inner washer body 20.

Adjacent pairs of prongs are circumferentially shifted toward each other so as to cause the adjacent radial margins of the prongs to overlap and thereby present a locking section or unit 22, as indicated by the bracket in Figures 4 and 6. Thus each locking section 22 includes a pair of oppositely disposed work engaging edges, indicated by the letter A, which present a rigid locking strut or section and a pair of oppositely disposed work engaging edges B of less rigidity. It might be said that each locking unit or section 22 includes a pair of relatively rigid locking edges or teeth and a pair of relatively resilient locking edges or teeth. When the washer is clamped against a work piece, the marginal overlapping portions of each locking section cause a relatively rigid locking effect by the teeth A and a relatively resilient or yieldable locking effect by the teeth B. The tendency for the prongs to completely flatten when clamped against the work is materially counteracted by the overlapping dispositions thereof.

In Figures 7 and 8 I have disclosed a slightly modified overlapping prong construction, the only difference being that the prongs of the washer in Figures 7 and 8, which I have designated by the numeral 16a, are slightly arcuate in circumferential cross section.. The edges or teeth 18a are acute to increase the biting effectiveness thereof when the washer is clamped against the work. It will be noted that these arcuately formed prongs 16a are grouped in pairs to present locking units or sections 22a in the manner just described in connection with the sections 22 disclosed in Figures 4 and 6.

It will also be apparent that the invention is not limited to lock washers having teeth along the outer margin, but contemplates similar pairs of overlapping teeth provided along the inner margin.

In Figures 9 and 10 a still further modified overlapping prong construction is disclosed. In Figure 9 I have disclosed the blank as it is stamped from a sheet of flat spring stock so as to present an inner annular body 20b and marginally severed so as to produce a plurality of marginal prongs 16b. The adjacent prongs 16b are shifted toward each other so as to produce the overlapping effect disclosed on the right half of Figure 10, and by dot-and-dash lines on the left half of Figure 10. The overlapping prongs of Figures 9 and 10 are similar to the overlapping prongs previously described, inasmuch as each pair of overlapping prongs provide a locking section or unit 22b. In all of the modifications, each locking unit functions independently of the other locking unit. In other words, the locking unit or section 22 functions independently of the next adjacent locking section for the reason that both of said sections are circumferentially separated. The same may be said about the locking section 22a shown in Figures 7 and 8. Likewise, each locking section 22b, while connected to the next adjacent locking section, functions independently thereof in its locking capacity.

The arrangement disclosed in Figures 9 and 10 differs somewhat from the other disclosures, inasmuch as the initial severance of the washer blank presents prongs extending tangentially from the outer periphery of the annular body. The free adjacent prongs are then flexed in opposite directions, and moved edgewise to the position shown in Figure 10. This latter shift takes place without causing any permanent injury to the washer stock. The prongs of the washer in Figure 10 overlap in much the same manner as the prongs shown in Figure 6, the only difference being that the portions of the prongs extending in opposite directions from the overlapping area are physically connected through a section of washer stock with a prong of the next adjacent locking section.

From the foregoing it will be apparent that my invention contemplates an improved overlapping washer construction, as well as improved methods of producing them. Obviously the invention is not limited to any particular shape of prong, nor is it limited to a washer having overlapping prongs provided along the outer periphery thereof.

It will also be apparent from the foregoing that the body portion and prongs of my improved washer maintain their original stock consistency despite the overlapping effect which is produced; further, that the original diameter of the annulus or ring, in which the washer prongs are formed, is maintained; also, that the inner diameter of the washer is unaffected by the shifting of the prongs to produce the overlapping thereof.

While I have disclosed several modifications in the present application, the invention is capable of other changes and modifications without departing from the spirit and scope of the appended claims.

Having thus described my invention, what I claim as new and desire to secure by Letters Patent is:

1. A lock washer of spring stock including a body portion and a plurality of pairs of overlapping prongs provided along at least one margin thereof to present oppositely disposed work engaging edges, each pair of overlapping prongs presenting a locking section, said locking sections being circumferentially spaced.

2. A lock washer of spring stock including a body portion and a plurality of pairs of overlapping radial prongs provided along at least one margin thereof to present paired oppositely disposed work engaging edges, each pair of overlapping prongs presenting a locking section functionally operative independently of the next adjacent locking section.

3. A lock washer of spring stock including a body portion and a plurality of overlapping prongs provided along at least one margin thereof to present oppositely disposed work engaging edges, each pair of overlapping prongs presenting a locking section including oppositely disposed resilient locking teeth and intermediate overlapping portions providing relatively rigid locking teeth when the washer is tightened against a work piece.

4. A lock washer of spring stock including an annular body portion and a plurality of overlapping prongs provided along at least one margin to present oppositely disposed work engaging edges, the overlapping portion of said prongs presenting relatively rigid teeth and the remaining portion of said prongs presenting relatively resilient teeth to resist a clamping force exerted thereagainst.

5. A lock washer of spring stock including a body portion and a plurality of overlapping prongs provided along at least one margin thereof, said overlapping prongs presenting oppositely disposed relatively rigid teeth intermediate oppositely disposed relatively resilient teeth for resisting a clamping force exerted thereagainst.

6. A lock washer of spring stock including a body portion and a plurality of radial overlapping prongs provided along one margin thereof, the overlapping portions of said prongs presenting relatively rigid oppositely disposed teeth, and the remaining portion of each overlapping set of prongs presenting relatively resilient oppositely disposed teeth for resisting a clamping force exerted thereagainst.

7. The method of producing lock washers from spring stock which includes the step of forming a plurality of annularly disposed prongs along a margin of said spring stock, and shifting adjacent prongs in opposite directions substantially in the plane of the stock to produce the overlapping thereof and sufficiently to render each overlapping pair of prongs circumferentially spaced from adjacent pairs of overlapping prongs.

8. The method of producing lock washers from spring stock which includes the step of forming a plurality of annularly disposed prongs along a margin of said spring stock, warping or twisting said prongs to position opposite edges thereof out of the plane of the washer stock, and shifting adjacent prongs in opposite directions substantially in the plane of the stock to produce independently operative pairs of overlapping prongs.

9. The method of producing lock washers from spring stock which comprises the steps of forming a plurality of prongs at a margin of the stock, and moving adjacent prongs toward each other to produce spaced pairs having portions thereof overlapping.

10. The method of producing lock washers from spring stock which comprises the steps of forming a plurality of prongs at a margin of the stock, and bending adjacent prongs toward each other substantially in the plane of the stock to produce spaced pairs of prongs having portions thereof overlapping.

11. A lock washer including a body portion, and a plurality of pairs of partially overlapping prongs at a margin thereof, each pair of prongs being spaced from an adjacent pair of prongs.

12. A lock washer including a body portion, and a plurality of pairs of prongs at a margin thereof, each pair of prongs being spaced from an adjacent pair of prongs, and each prong of each pair being plane and having a portion overlapping a portion of the other prong in planar relationship.

13. A lock washer including a body portion, and a plurality of pairs of prongs at a margin thereof, each pair of prongs being spaced from an adjacent pair of prongs, each prong of each pair being concave toward the other prong of the pair, and each prong of each pair having a portion overlapping a portion of the other prong.

14. A flat type lock washer including a body, said body being cut circumferentially so as to provide circumferentially elongated prongs at a margin of the body, a portion at the free extremity of each prong being in end-to-end and overlapping relationship with an adjacent prong.

CARL G. OLSON.